United States Patent
Xing et al.

(10) Patent No.: US 11,290,489 B2
(45) Date of Patent: Mar. 29, 2022

(54) ADAPTATION OF ATTACK SURFACE REDUCTION CLUSTERS

(71) Applicant: Microsoft Technology Licensing, LLC, Redmond, WA (US)

(72) Inventors: Yalan Xing, Kirkland, WA (US); Joseph Carl Nelson Blackbird, Seattle, WA (US); Francis Allan Tan Seng, Redmond, WA (US); Prachi Rathee, Sammamish, WA (US); Peter Thayer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 586 days.

(21) Appl. No.: 16/295,025

(22) Filed: Mar. 7, 2019

(65) Prior Publication Data

US 2020/0287938 A1 Sep. 10, 2020

(51) Int. Cl.
*H04L 29/06* (2006.01)
*G06Q 10/06* (2012.01)

(52) U.S. Cl.
CPC ......... *H04L 63/20* (2013.01); *G06Q 10/0637* (2013.01); *H04L 63/104* (2013.01); *H04L 63/145* (2013.01)

(58) Field of Classification Search
CPC ...... H04L 63/20; H04L 63/104; H04L 63/145
USPC .......................................................... 726/1
See application file for complete search history.

(56) References Cited

U.S. PATENT DOCUMENTS

| 8,683,547 | B2* | 3/2014 | Apparao ............... G06Q 10/06 726/1 |
| 9,489,517 | B2 | 11/2016 | Murthy |
| 9,792,459 | B2* | 10/2017 | Forsberg ............... H04L 63/08 |
| 2004/0015719 | A1* | 1/2004 | Lee ..................... H04L 63/0227 726/23 |
| 2011/0099602 | A1* | 4/2011 | Apparao ............... H04L 63/20 726/1 |
| 2012/0258437 | A1* | 10/2012 | Sadeh-Koniecpol ... G06F 21/55 434/362 |

(Continued)

OTHER PUBLICATIONS

"International Search Report and Written Opinion Issued in PCT Application No. PCT/US2020/015998", dated Jun. 30, 2020, 15 Pages.

(Continued)

*Primary Examiner* — Teshome Hailu
(74) *Attorney, Agent, or Firm* — Mark K. Young; Mayer & Williams, PC

(57) ABSTRACT

A computing system performs adaptive clustering of machines (e.g., computing devices) and/or machine users in an organization for attack surface reduction (ASR) responsively to event feedback including system-based exclusion events and user-based requests for exclusion. The cluster adaptation may be applied to conventional vector-quantization clustering algorithms, for example K-Means, expectation-maximization (EM) clustering, or affinity clustering, to provide adaptable clusters of machines or users. The adaptation enables aggregation or disaggregation of endpoints into clusters to minimize negative business impacts on the organization while maximizing security in view of changes in the organization that occur dynamically such as varying roles for users, new applications and updates being released, and the like.

18 Claims, 24 Drawing Sheets

(56) References Cited

U.S. PATENT DOCUMENTS

| | | | |
|---|---|---|---|
| 2014/0181898 A1* | 6/2014 | Apparao | H04L 29/0685 726/1 |
| 2014/0380405 A1* | 12/2014 | Forsberg | H04W 12/35 726/1 |
| 2017/0078309 A1 | 3/2017 | Allen et al. | |
| 2019/0052659 A1 | 2/2019 | Weingarten et al. | |
| 2020/0028871 A1* | 1/2020 | Thayer | H04L 63/20 |
| 2020/0388390 A1* | 12/2020 | Singh | G16H 10/20 |

OTHER PUBLICATIONS

"Attack Surface and How to Reduce it", Retrieved From: http://www.managni.com/attack-surface-and-how-to-reduce-it/, Dec. 7, 2018, 6 Pages.

Bagherjeiran, et al., "Adaptive Clustering: Obtaining Better Clusters Using Feedback and Past Experience", In Proceedings of Fifth IEEE International Conference on Data Mining, Nov. 27, 2005, 5 Pages.

Jcaparas, et al., "Overview of attack surface reduction", Retrieved From: https://docs.microsoft.com/en-us/windows/security/threat-protection/windows-defender-atp/overview-attack-surface-reduction, Jan. 7, 2018, 1 Page.

Kurmus, et al., "Quantifiable Run-time Kernel Attack Surface Reduction", In International Conference on Detection of Intrusions and Malware, and Vulnerability Assessment, Jul. 10, 2014, 20 Pages.

Steinegger, et al., "Attack Surface Reduction for Web Services based on Authorization Patterns", In Proceedings of the Eighth International Conference on Emerging Security Information, Systems and Technologies of SECURWARE, Nov. 16, 2014, pp. 194-201.

\* cited by examiner

FIG 3

| Endpoint | WHQL | HVCI | No PS exec Exclude file A | No PS exec Exclude file A, B, C, | No PS exec Exclude file C, D, E | Block WIN API Exclude file A, C, F | Block WIN API Exclude file A,C |
|---|---|---|---|---|---|---|---|
| A | 1 | 0 | 0 | 1 | 0 | 1 | 1 |
| B | 1 | 1 | 1 | 1 | 0 | 0 | 0 |
| C | 0 | 1 | 0 | 0 | 1 | 1 | 0 |
| D | 1 | 0 | 0 | 0 | 0 | 1 | 0 |
| E | 1 | 0 | 1 | 1 | 0 | 0 | 0 |

Starting Feature Matrix

1000

| | HVCI | WHQL | PS Exec | EG_FileA | EG_FileB | EG_FileC | EG_FileD |
|---|---|---|---|---|---|---|---|
| A | 1 | 0 | 1 | 0 | 0 | 0 | 0 |
| B | 1 | 0 | 1 | 1 | 1 | 0 | 0 |
| C | 1 | 1 | 1 | 0 | 0 | 0 | 0 |
| D | 1 | 1 | 1 | 0 | 0 | 1 | 1 |
| E | 0 | 1 | 1 | 1 | 1 | 1 | 0 |
| F | 0 | 1 | 0 | 1 | 0 | 1 | 1 |
| X | 0 | 1 | 0 | 1 | 0 | 1 | 0 |
| Y | 1 | 0 | 1 | 0 | 0 | 0 | 0 |
| Z | 1 | 1 | 1 | 0 | 0 | 0 | 0 |

FIG 11

Starting Affinity Matrix

1100

| | A | B | C | D | E | F | X | Y | Z |
|---|---|---|---|---|---|---|---|---|---|
| A | 1.00 | 0.88 | 0.75 | 0.63 | 0.31 | 0.06 | 0.13 | 1.00 | 0.75 |
| B | 0.88 | 1.00 | 0.63 | 0.50 | 0.44 | 0.06 | 0.13 | 0.88 | 0.63 |
| C | 0.75 | 0.63 | 1.00 | 0.88 | 0.56 | 0.31 | 0.38 | 0.75 | 1.00 |
| D | 0.63 | 0.50 | 0.88 | 1.00 | 0.56 | 0.44 | 0.38 | 0.63 | 0.88 |
| E | 0.31 | 0.44 | 0.56 | 0.56 | 1.00 | 0.63 | 0.69 | 0.31 | 0.56 |
| F | 0.06 | 0.06 | 0.31 | 0.44 | 0.63 | 1.00 | 0.94 | 0.06 | 0.31 |
| X | 0.13 | 0.13 | 0.38 | 0.38 | 0.69 | 0.94 | 1.00 | 0.13 | 0.38 |
| Y | 1.00 | 0.88 | 0.75 | 0.63 | 0.31 | 0.06 | 0.13 | 1.00 | 0.75 |
| Z | 0.75 | 0.63 | 1.00 | 0.88 | 0.56 | 0.31 | 0.38 | 0.75 | 1.00 |

*FIG 12*

Feature matrix showing HVCI change on endpoint D

1200

| | HVCI | WHQL | PS Exec | EG_FileA | EG_FileB | EG_FileC | EG_FileD |
|---|---|---|---|---|---|---|---|
| A | 1 | 0 | 1 | 0 | 0 | 0 | 0 |
| B | 1 | 0 | 1 | 1 | 1 | 0 | 0 |
| C | 1 | 1 | 1 | 0 | 0 | 0 | 0 |
| D | 0 | 1 | 1 | 1 | 1 | 1 | 1 |
| E | 0 | 1 | 0 | 1 | 0 | 1 | 0 |
| F | 0 | 1 | 0 | 1 | 0 | 1 | 1 |
| X | 0 | 1 | 1 | 0 | 0 | 1 | 0 |
| Y | 1 | 0 | 1 | 0 | 0 | 0 | 0 |
| Z | 1 | 1 | 1 | 0 | 0 | 0 | 0 |

Affinity matrix based on D's HVCl change

1400

|   | A | B | C | D | E | F | X | Y | Z |
|---|---|---|---|---|---|---|---|---|---|
| A | 1.00 | 0.88 | 0.75 | 0.63 | 0.31 | 0.06 | 0.13 | 1.00 | 0.75 |
| B | 0.88 | 1.00 | 0.63 | 0.50 | 0.44 | 0.06 | 0.13 | 0.88 | 0.63 |
| C | 0.75 | 0.63 | 1.00 | 0.88 | 0.56 | 0.31 | 0.38 | 0.75 | 1.00 |
| D | 0.38 | 0.25 | 0.63 | 0.75 | 0.81 | 0.69 | 0.63 | 0.38 | 0.63 |
| E | 0.31 | 0.44 | 0.56 | 0.56 | 1.00 | 0.63 | 0.69 | 0.31 | 0.56 |
| F | 0.06 | 0.06 | 0.31 | 0.44 | 0.63 | 1.00 | 0.94 | 0.06 | 0.31 |
| X | 0.13 | 0.13 | 0.38 | 0.38 | 0.69 | 0.94 | 1.00 | 0.13 | 0.38 |
| Y | 1.00 | 0.88 | 0.75 | 0.63 | 0.31 | 0.06 | 0.13 | 1.00 | 0.75 |
| Z | 0.75 | 0.63 | 1.00 | 0.88 | 0.56 | 0.31 | 0.38 | 0.75

FIG 15

Feature matrix showing recalculation of X and Z

1500

| | HVCI | WHQL | PS Exec | EG_FileA | EG_FileB | EG_FileC | EG_FileD |
|---|---|---|---|---|---|---|---|
| A | 1 | 0 | 1 | 0 | 0 | 0 | 0 |
| B | 1 | 0 | 1 | 1 | 1 | 0 | 0 |
| C | 1 | 1 | 1 | 0 | 0 | 0 | 0 |
| D | 0 | 1 | 1 | 0 | 1 | 1 | 1 |
| E | 0 | 1 | 1 | 1 | 0 | 1 | 0 |
| F | 0 | 1 | 0 | 1 | 0 | 1 | 1 |
| X | 0 | 1 | 1 | 0 | 0 | 0 | 0 |
| Y | 1 | 0 | 1 | 0 | 0 | 0 | 0 |
| Z | 1 | 1 | 1 | 0 | 0 | 0 | 0 |

Affinity Matrix based on recalculation — 1600

|   | A | B | C | D | E | F | X | Y | Z |
|---|---|---|---|---|---|---|---|---|---|
| A | 1.00 | 0.88 | 0.75 | 0.38 | 0.31 | 0.06 | 0.19 | 1.00 | 0.75 |
| B | 0.88 | 1.00 | 0.63 | 0.25 | 0.44 | 0.06 | 0.06 | 0.88 | 0.63 |
| C | 0.75 | 0.63 | 1.00 | 0.63 | 0.56 | 0.31 | 0.44 | 0.75 | 1.00 |
| D | 0.38 | 0.25 | 0.63 | 1.00 | 0.81 | 0.69 | 0.69 | 0.38 | 0.63 |
| E | 0.31 | 0.44 | 0.56 | 0.81 | 1.00 | 0.63 | 0.63 | 0.31 | 0.56 |
| F | 0.06 | 0.06 | 0.31 | 0.69 | 0.63 | 1.00 | 0.88 | 0.06 | 0.31 |
| X | 0.19 | 0.06 | 0.44 | 0.69 | 0.63 | 0.88 | 1.00 | 0.19 | 0.44 |
| Y | 1.00 | 0.88 | 0.75 | 0.38 | 0.31 | 0.06 | 0.19 | 1.00 | 0.75 |
| Z | 0.75 | 0.63 | 1.00 | 0.63 | 0.56 | 0.31 | 0.44 | 0.75 | 1.00 |

Feature matrix for endpoint to new cluster

1700

|    | HVCI | WHQL | PS Exec | EG_FileA | EG_FileB | EG_FileC | EG_FileD |
|----|------|------|---------|----------|----------|----------|----------|
| A  | 1    | 0    | 1       | 0        | 0        | 0        | 0        |
| B  | 1    | 0    | 1       | 1        | 1        | 0        | 0        |
| C  | 1    | 1    | 1       | 0        | 0        | 0        | 0        |
| D  | 0    | 1    | 1       | 0        | 0        | 1        | 1        |
| E  | 0    | 1    | 1       | 1        | 1        | 1        | 0        |
| F  | 0    | 1    | 0       | 1        | 0        | 1        | 1        |
| X  | 0    | 0    | 0       | 1        | 1        | 0        | 1        |
| Y  | 1    | 1    | 1       | 0        | 0        | 0        | 0        |
| Z  | 1    | 1    | 1       | 0        | 0        | 0        | 0        |
| ZZ | 0    | 1    | 1       | 0        | 0        | 1        | 0        |

FIG 18

Affinity matrix for endpoint to new cluster 1800

|    | A    | B    | C    | D    | E    | F    | X    | Y    | Z    | ZZ   |
|----|------|------|------|------|------|------|------|------|------|------|
| A  | 1.00 | 0.88 | 0.75 | 0.38 | 0.31 | 0.06 | 0.00 | 1.00 | 0.75 | 0.44 |
| B  | 0.88 | 1.00 | 0.63 | 0.25 | 0.44 | 0.06 | 0.13 | 0.88 | 0.63 | 0.31 |
| C  | 0.75 | 0.63 | 1.00 | 0.63 | 0.56 | 0.31 | 0.25 | 0.75 | 1.00 | 0.69 |
| D  | 0.38 | 0.25 | 0.63 | 1.00 | 0.81 | 0.69 | 0.63 | 0.38 | 0.63 | 0.94 |
| E  | 0.31 | 0.44 | 0.56 | 0.81 | 1.00 | 0.63 | 0.69 | 0.31 | 0.56 | 0.88 |
| F  | 0.06 | 0.06 | 0.31 | 0.69 | 0.63 | 1.00 | 0.94 | 0.06 | 0.31 | 0.63 |
| X  | 0.00 | 0.13 | 0.25 | 0.63 | 0.69 | 0.94 | 1.00 | 0.00 | 0.25 | 0.56 |
| Y  | 1.00 | 0.88 | 0.75 | 0.38 | 0.31 | 0.06 | 0.00 | 1.00 | 0.75 | 0.44 |
| Z  | 0.75 | 0.63 | 1.00 | 0.63 | 0.56 | 0.31 | 0.25 | 0.75 | 1.00 | 0.69 |
| ZZ | 0.44 | 0.31 | 0.69 | 0.94 | 0.88 | 0.63 | 0.56 | 0.44 | 0.69 | 1.00 |

1805, 1810, 1815, 1820

ADAPTATION OF ATTACK SURFACE REDUCTION CLUSTERS

BACKGROUND

Attack Surface Reduction (ASR) is a security technique that excludes unused application or operating system services and features which could present malicious exploitation opportunities on a computing device. For example, excluding Server Message Block (SMB) file sharing from a device, if unused, removes a service over which malware can be propagated.

SUMMARY

A computing system performs adaptive clustering of machines (e.g., computing devices) and/or machine users in an organization for attack surface reduction (ASR) responsively to event feedback including system-based exclusion events and user-based requests for exclusion. The cluster adaptation may be applied to conventional vector-quantization clustering algorithms, for example hierarchical agglomerative clustering, K-Means, expectation-maximization (EM) clustering, or affinity clustering, to provide adaptable clusters of machines or users. The adaptation enables aggregation or disaggregation of endpoints into clusters to minimize negative business impacts on the organization while maximizing security in view of changes in the organization that occur dynamically such as varying roles for users, new applications and updates being released, and the like.

In various illustrative examples, a cluster adaptation component operating on the computing system applies ASR rules for security settings that implement a hierarchical clustering analysis using a bottom-up approach. Machines or users, called "endpoints" are initially placed in their own cluster and clusters with similar characteristics are joined based on a minimum error distance determined by the clustering algorithm. In an alternative arrangement, a penalty score determination reflecting differential rule settings among endpoints is used for clustering rather than distance. The cluster joining is repeated up the hierarchy and ends when all endpoints are in a single cluster. With each cluster iteration, some security is lost. The top most node of the tree (with one cluster) contains the most permissive ASR settings.

The result of the hierarchical cluster analysis is a set of potential cluster groups. At the tail of the hierarchy is a cluster with each node representing a single endpoint. The ASR rules are tailored for each level. Movement up the hierarchy represents a set of tradeoffs, for example ASR rules can be disabled, or unnecessary files (for some nodes) may be included. At the top of the hierarchy are ASR rules which can be applied universally across an organization with zero business impact, but which provide a sub-optimal security solution. The trade-offs between security and business impact with each level are not linear. There is an inflection point where cluster growth produces diminishing gains. Accordingly, an optimal number of clusters in a working set (i.e., clusters selected for deployment into the computing environment 100 (FIG. 1) and then adapted as changes occur) is based on the number of endpoints within a set, the diversity of the endpoints, and the number of ASR rules being simultaneously applied.

The present adaptation of ASR clusters advantageously improves the implementation of security on the endpoints against malware and actions of bad actors by reducing the footprint of features and services that are vulnerable to attack. To further reduce time that is needed to manage and maintain ASR configurations attempting to keep business impact low but security high, the present ASR cluster adaption may be dynamically performed as endpoint characteristics change, for example, through changing user roles, new applications being deployed in the organization, and application and software updates being released. The present ASR cluster adaptation further improves efficiencies of the computing platforms used for IT and security management by providing a centralized point that simplifies and streamlines administration of ASR clusters and endpoints.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 3 shows an illustrative ASR table;

FIG. 10 shows an illustrative starting feature matrix;

FIG. 11 shows an illustrative starting affinity matrix;

FIG. 12 shows an illustrative feature matrix for an endpoint to cluster affinity form of adaptation in which an endpoint jumps to another cluster;

FIG. 14 shows an illustrative affinity matrix for the endpoint to cluster affinity form of adaptation;

FIG. 15 shows an illustrative feature matrix with recalculated clusters;

FIG. 16 shows an illustrative affinity matrix based on the recalculation;

FIG. 17 shows an illustrative feature matrix for an endpoint to new cluster form of adaptation;

FIG. 18 shows an illustrative affinity matrix for the endpoint to new cluster form of adaptation;

Like reference numerals indicate like elements in the drawings. Elements are not drawn to scale unless otherwise indicated.

DETAILED DESCRIPTION

A challenge to attack surface reduction (ASR) is identifying services which are truly unused versus those services which are used infrequently. Disabling a service which is used may have a negative business productivity impact. Machine clustering of computing devices requiring similar services (e.g., people in finance or developer roles) is a technique to generate machine/user clusters based on activities and apply a set of ASR policies to those machines/users. Clustering simplifies the implementation of ASR, allowing information technology (IT) and security administrators to automatically create, view, and approve similar groups of changes to clusters of machines/users.

Clusters often are not static. A user in a cluster today may have a change in role tomorrow. Services used infrequently may be missed in the initial cluster generation. Cluster formation must adapt based on user and system feedback. Events, such as a user requiring a service available to other users in their company can move the user to a different ASR cluster. The accumulation of lateral moves, user requested exclusions, and ASR exceptions provides the data required to adapt the cluster algorithm improving its performance over time, as described in more detail below.

Figure 1:
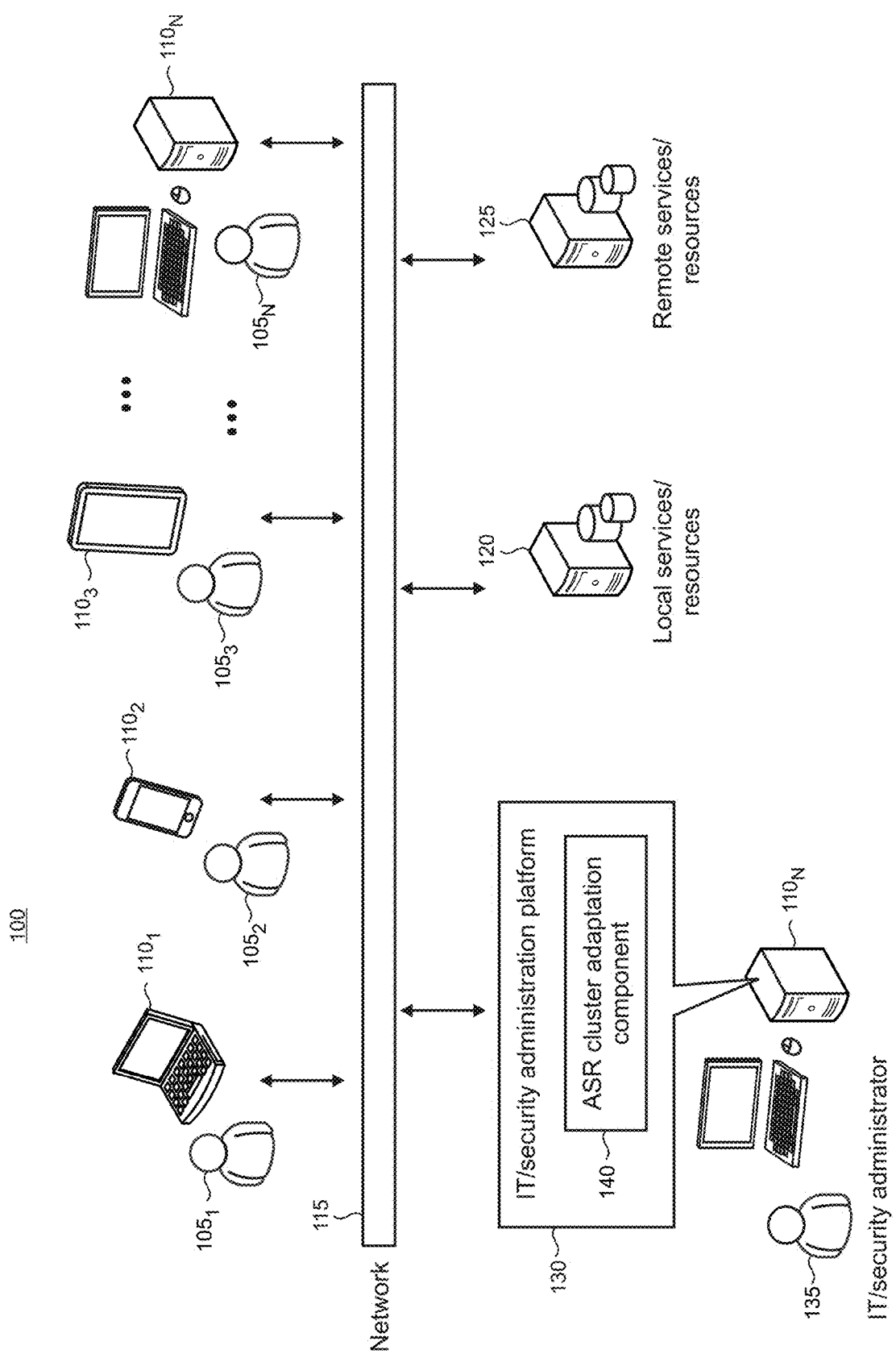
FIG. 1 shows an illustrative computing environment in which users and machines (i.e., computing devices) may be adaptively clustered for attack surface reduction (ASR)

Turning now to the drawings, FIG. 1 shows an illustrative computing environment 100 in which users 105 and machines 110 (i.e., computing devices) may be adaptively clustered for attack surface reduction (ASR). For example, the computing environment may be associated with an organization, business, enterprise, etc. The machines are operatively coupled to a network 115 which may include, for example, local area network (LAN) and or wide area network (WAN) infrastructure. Machines may be locally instantiated in the environment 100 or remotely instantiated to support remote users and may include, for example, personal computers (PCs), servers, laptop computers, tablet computers, and smartphones with which the users may use applications and access local or remote services or resources (as respectively indicated by reference numerals 120 and 125), and the like. The remote services/resources may be cloud-based in some implementations. Either or both machines and users can be referred to here as "endpoints" however in the following illustrative examples the endpoints comprise machines.

Other types of electronic and computing devices may also be usable as machines within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. IoT devices can include household devices such as appliances as well as industrial devices such as sensors, valves, actuators, machines, and the like. Endpoints may also incorporate virtual computing devices or machines. In the discussion that follows, the use of the terms "computing device," "machine," and "endpoint" are intended to cover all devices that perform some form of real or virtual computing operations, whether they be implemented locally, remotely, or by a combination of local and remote operations and/or data storage.

An IT or security administration computing platform 130 is also present in the computing environment 100 that may be accessed by an IT/security administrator 135. The IT/security administration platform 130 supports an ASR cluster adaptation component 140 that may be implemented for example, as a software application, that enables centralized IT or security management for the endpoints in the environment. The IT/security administration platform can be implemented as a local resource in some cases or may be implemented as a remote or cloud-based resource in other cases. In alternative embodiments the ASR cluster adaptation component can execute on one or more endpoints 110 or execute using distributed computing across a range of computing devices or services.

Figure 2:
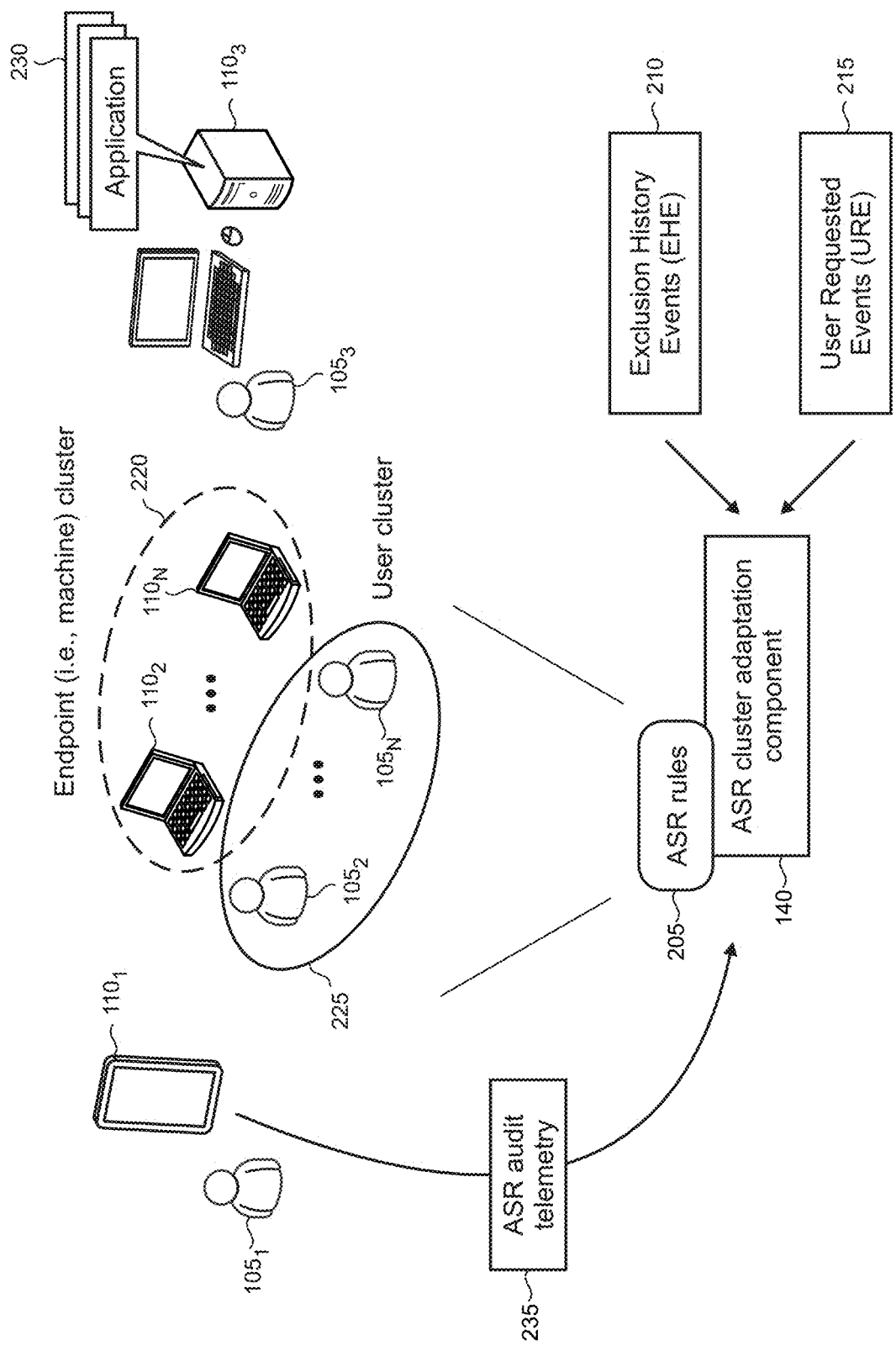
FIG. 2 shows illustrative clustering of machines and users according to ASR rules that are adaptively constructed based on Exclusion History Events (EHE) and User Requested Events (URE)

FIG. 2 shows illustrative clustering of machines 110 and users 105 according to ASR rules 205 that are exposed by the ASR cluster adaptation component 140. The ASR policies are adaptively constructed based on Exclusion History Events (EHE) 210 and User Requested Events (URE) 215, as described below. In this illustrative example, one cluster 220 includes endpoints 110 and another cluster 225 includes users 105. ASR adaptation for machines is described in the discussion that follows. However, it may be appreciated that the present ASR adaptation may also be applied to users or combinations of user and machines as needed to meet the needs of a particular ASR adaptation implementation.

As shown in FIG. 2, endpoints can run a variety of different applications (as representatively indicated by reference numeral 230) that may execute locally, remotely, or using a combination of local and remote execution. As used herein, the term "application" is broadly defined and may include discrete features and services that are implemented at the application level as well as those that are implemented by the operating system of an endpoint. Applications can vary by endpoint or user according to their specific roles and assignments within an organization. Such roles and assignments can be dynamic, so the applications that are utilized on a given endpoint can also vary dynamically. In some implementations, application usage can be described by telemetry data 235 that is collected from each of the endpoints 110 by the ASR cluster adaptation component 140.

FIG. 3 shows an illustrative ASR table 300 that shows how services associated with the applications 230 may be restricted or enabled from a group of endpoints 110, including endpoints A, B, C, D, and E, as a binary decision where "1" is enabled and "0" is restricted. In ASR table 300, exemplary services include Windows Hardware Quality Labs (WHQL), Hypervisor-enforced code integrity (HVCI), a Windows utility named PS Exec, and a Windows application programming interface named Win API. For ASR rules with file exclusions, enabling a rule includes the assignment of a minimal file exclusion set. For example, endpoint A in the ASR table 300 can run if files A, C, and F are excluded, but it can also run if only A and C are excluded. It is the latter case which minimizes attack surface. A solution will typically seek to minimize the number of clusters. While a cluster with "Block WIN API Exclude A, C" is a solution, it generates a cluster of only one endpoint, as indicated by reference numeral 305.

Figure 4:
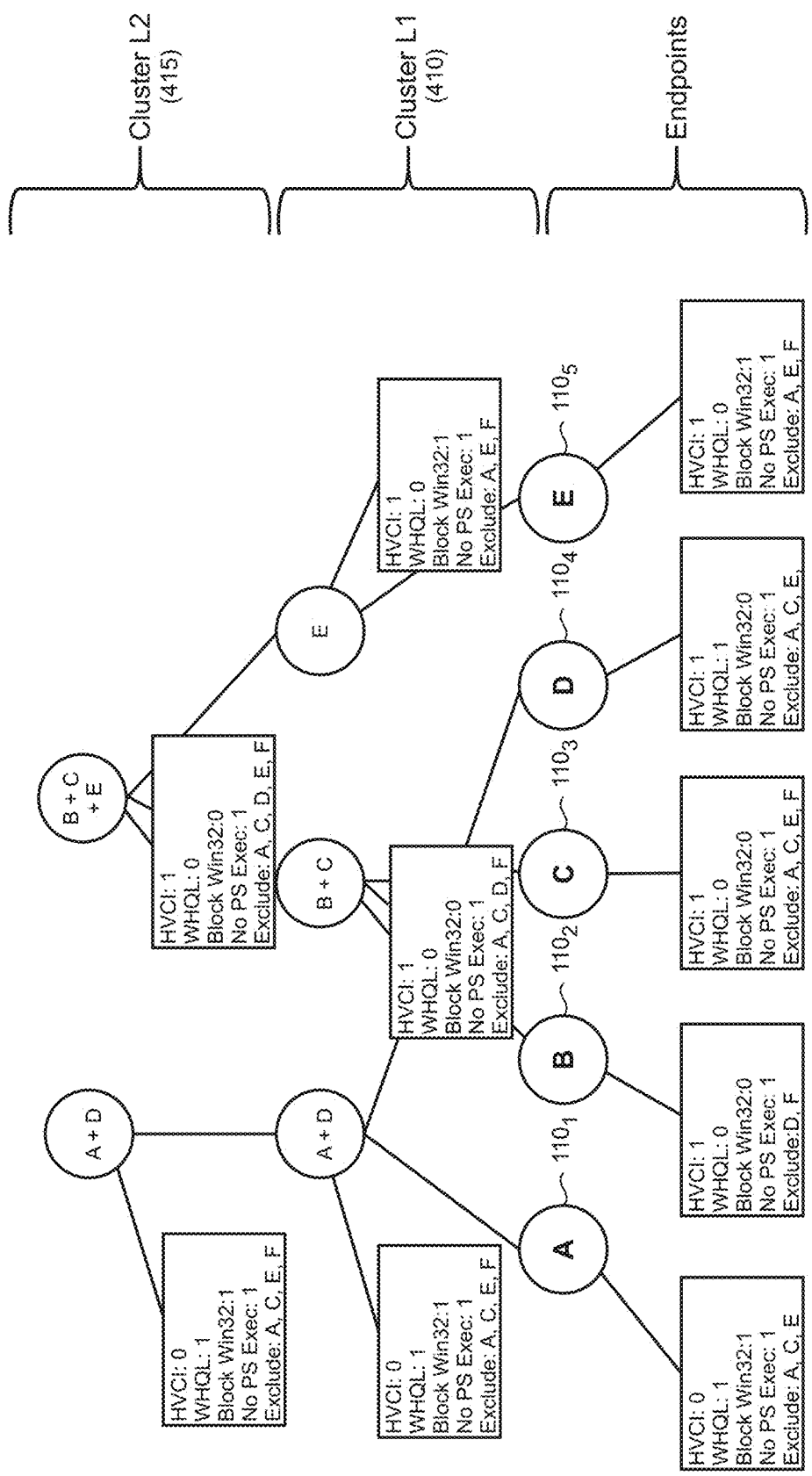
FIG. 4 shows an illustrative clustering hierarchy.

FIG. 4 shows an illustrative clustering hierarchy 400 that provides a bottom up approach in which each endpoint 110 is placed into its own cluster. Then, using a standard vector quantization clustering algorithm such as K-Means, expectation-maximization (EM) clustering, or affinity clustering, endpoints are joined in clusters at L1 (410) of the hierarchy to minimize error distances calculated by the algorithm. In the next cluster layer L2 (415), endpoints with similar characteristics are joined. This process is repeated up the hierarchy and ends when all endpoints are in one cluster (not shown). With each cluster level iteration, some security positioning is lost. The top most node of the hierarchy with the single cluster thus contains the most permissive ASR settings.

Figure 5:
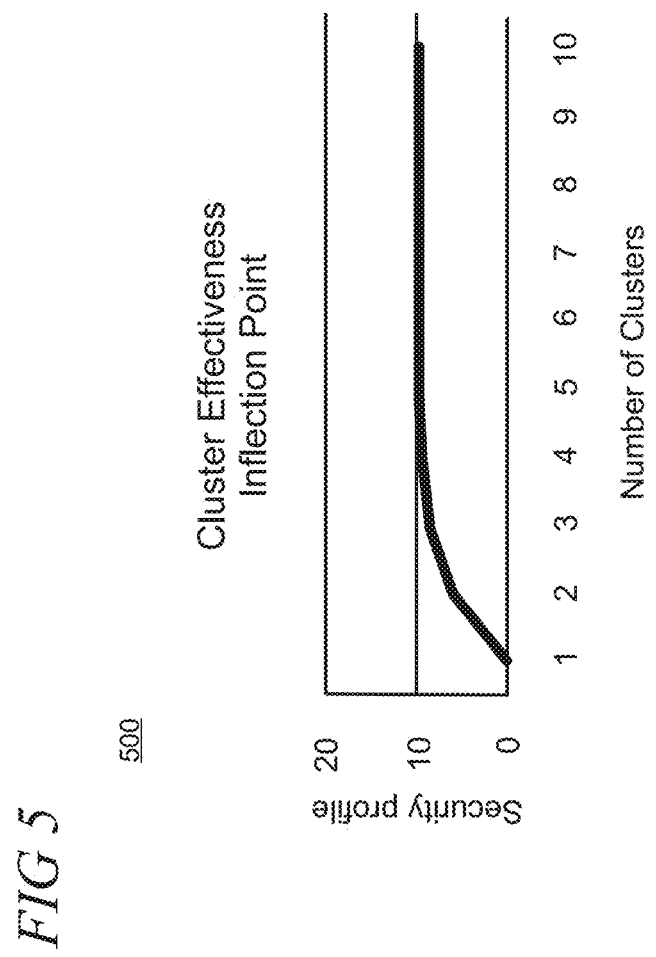
FIG. 5 is an illustrative cluster effectiveness curve showing an inflection point where cluster growth produces diminishing security gains.

The result of the clustering shown in the hierarchy 400 is a set of potential cluster groups. At the tail of the hierarchy is a cluster with each node representing a single endpoint. The ASR security settings are tailored at the individual level. Moving up the hierarchy presents a set of tradeoffs. ASR rules can be disabled or unnecessary files (for some nodes) may be included. At the top of the hierarchy are rules which can be applied universally across an organization with zero business impact but represent a sub-optimal security solution. However, the tradeoffs of security versus business impact with each cluster level in the hierarchy is not linear. As shown in cluster effectiveness curve 500 in FIG. 5, there is an inflection point where cluster growth produces diminishing security gains. Accordingly, an "optimal" cluster number will be based on the number of endpoints within the set, the diversity of the endpoints, and the number of ASR rules being clustered simultaneously.

When designing an ASR clustering solution, it may be reasonable to assume that some initial approaches will be proven to be suboptimal. When users are grouped in clusters seeking to minimize business impact and maximize security using available data it may still be likely that an infrequently used application will be launched with a business impact, a user will change roles, or an application will be updated with a release utilizing a service that was previously denied. Such suboptimal performance can be addressed by cluster adaptation.

ASR clusters can generally be adapted using several input parameters available for model tuning. These parameters may include, for example: 1) exceptions for applications which are already excluded in other clusters (and thus presumed benign); 2) exceptions when user roles change as identified by membership in a directory such as Azure Active Directory (AAD) groups; 3) exceptions generated for applications which have been recently updated; and 4) user input, in the form of user initiated or user requested exceptions.

However, some caution may be warranted as an application update exposing bad behavior could insert malware via an update, or a user may view a role change as justification for reprisal or to share a password. In addition, a spike in ASR blocks may be caused by a process change or an actual malware attack. Accordingly, as noted above in the text accompanying FIG. 2, the present adaptation of ASR clusters uses Exclusion History Events (EHE) 210 and User Requested Events (URE) 215, however, other information sources may also be used depending on the requirements of a given implementation. An EHE arises whenever an event is blocked that is associated with a file or service which is permitted in a different cluster. A URE is an approved request or an inclusion that is added by a user.

Figure 6:
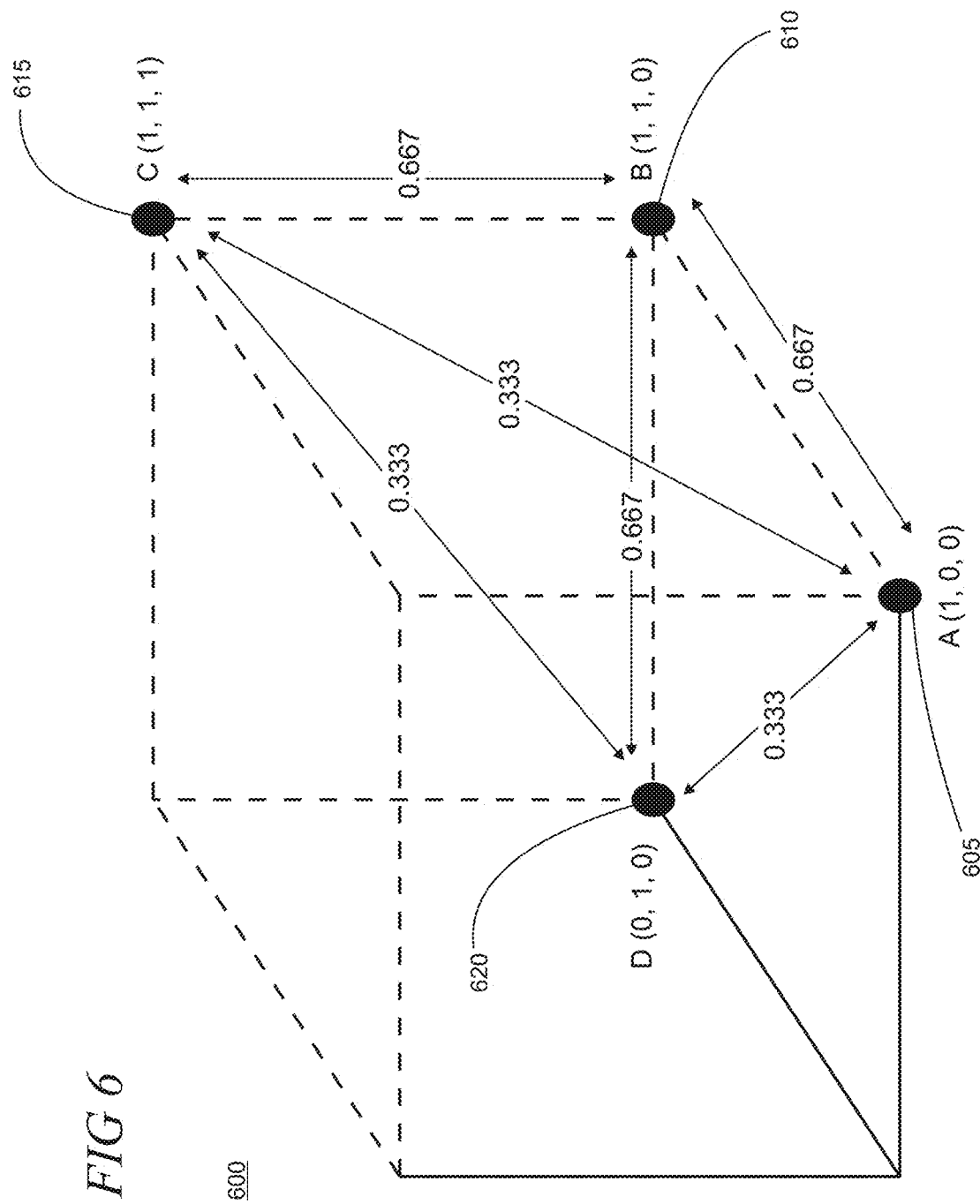
FIG. 6 is an illustrative n-dimensional binary space that shows endpoint and cluster affinity on which the present adaptation of ASR clusters may be based.

Adaptation is based on endpoint and cluster affinity. Affinity is a mapping of cluster vector orthogonality in an n-dimensional binary space 600 as shown in FIG. 6 where the endpoints A, B, C, and D are respectively indicated by reference numerals 605, 610, 615, and 620. The formula for cluster vector orthogonality is shown by equation (1):

$$\frac{\sum_{i=1}^{N} 1 - (Y_i - M_i)^2}{N} \quad (1)$$

where Y, M are clusters or endpoints and i represents the binary attribute being compared. For example, in the following three-dimensional ASR space, the calculated affinity between A and B is shown by equation (2):

$$\frac{1 - (1-0)^2 + 1 - (0-1)^2 + 1 - (0-0)^2}{3} = 0.667 \quad (2)$$

where A and B have two elements in common as shown in FIG. 6. The higher the affinity, the closer the relation.

As discussed above, ASR clustering may utilize conventional vector-based agglomerative clustering methods which repeatedly identify two groups that are closest together by forming a distance matrix, and then merging the identified groups to form a new parent cluster. The identification and merging are iterated until the clusters are merged together to form a single group. Increased distance represents heightened security risk in the context of ASR clustering.

Figure 7:
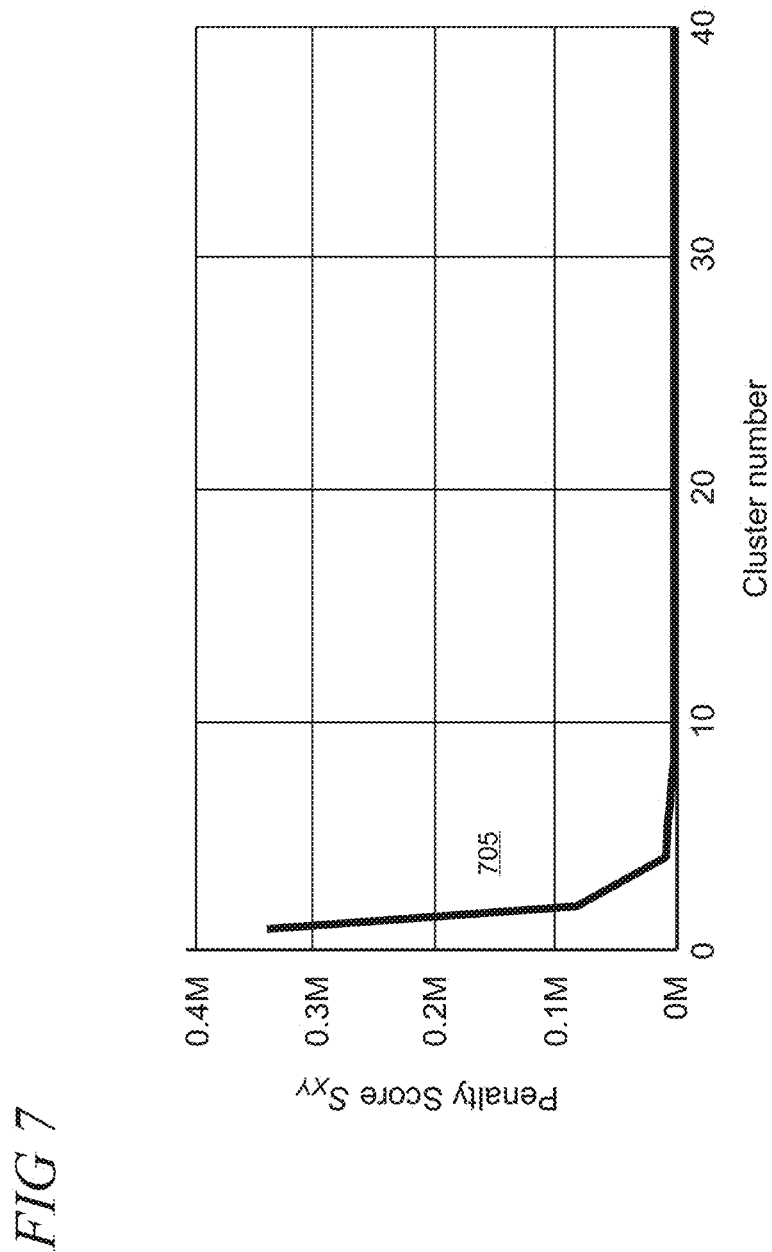
FIG. 7 shows a curve in which a calculated penalty score is mapped against cluster number.

In addition to conventional agglomerative clustering, the present adaptation of ASR clusters may employ a modified method for distance calculations. Here, the distance concept is replaced with a term "Penalty Score, $S_{XY}$." The Penalty Score reflects differential rule settings between the groups and the number of endpoints that would need to change feature settings to comply with new cluster settings. Moving up on an ASR cluster hierarchy, the Penalty Score increases exponentially as cluster number N drops below an inflection point which reflects a dramatic loss of security as shown in the curve 705 in FIG. 7. The Penalty Score formula is given in equation (3):

$$S_{XY} = N_X \times \sum_{i=1}^{n} \left| X_i - \min(X_i - Y_i) \right| + N_Y \times \sum_{i=1}^{n} \left| Y_i - \min(X_i - Y_i) \right| \quad (3)$$

Figure 8:
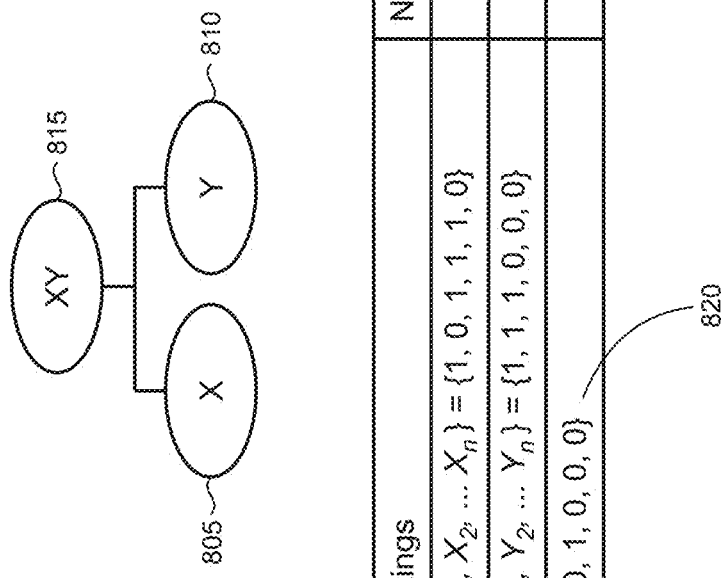
FIG. 8 shows an illustrative example of an alternative clustering methodology based on a penalty score determination that reflects differential rule setting among endpoints.

As shown, the Penalty Score (i.e., the replacement for "distance" in conventional methodologies) is the number of differential digits between endpoints multiplied by the number of endpoints that adopt such difference through clustering. An illustrative example of ASR clustering using the Penalty Score calculation is shown in FIG. 8 in which clusters X (indicated by reference numeral 805) and Y (810) form a new parent cluster XY (815). Cluster XY has rule settings that are inherited from the more permissive setting of the X cluster and Y cluster as indicated by reference numeral 820. Cluster X with five endpoints has settings that vary from those in cluster XY in two instances, while cluster Y with 10 endpoints varies from XY by one setting. Accordingly, the Penalty Score for merging X and Y is $S_{XY}=5*2+10*1=20$.

Three forms of adaptation may be utilized including endpoint to cluster, cluster to cluster, and endpoint to new cluster. The endpoint to cluster adaptation is an aggregation where an endpoint "jumps" clusters when its affinity to another cluster is higher than its affinity for its current cluster's endpoints. The cluster to cluster adaptation is an aggregation where clusters merge when a cluster's affinity for another cluster reaches some predetermined threshold. The endpoint to new cluster adaptation is a disaggregation in which a cluster splits when the affinity of one or more endpoints in a cluster is greater for other endpoints outside its cluster. The adaptations are typically performed on a normalized basis according to a size of the exclusion set because clustering is performed using a bottom up aggregation. Without normalization, an ASR rule with 100 possible exclusions would have a higher rating than an ASR rule with no exclusions.

Figure 9:
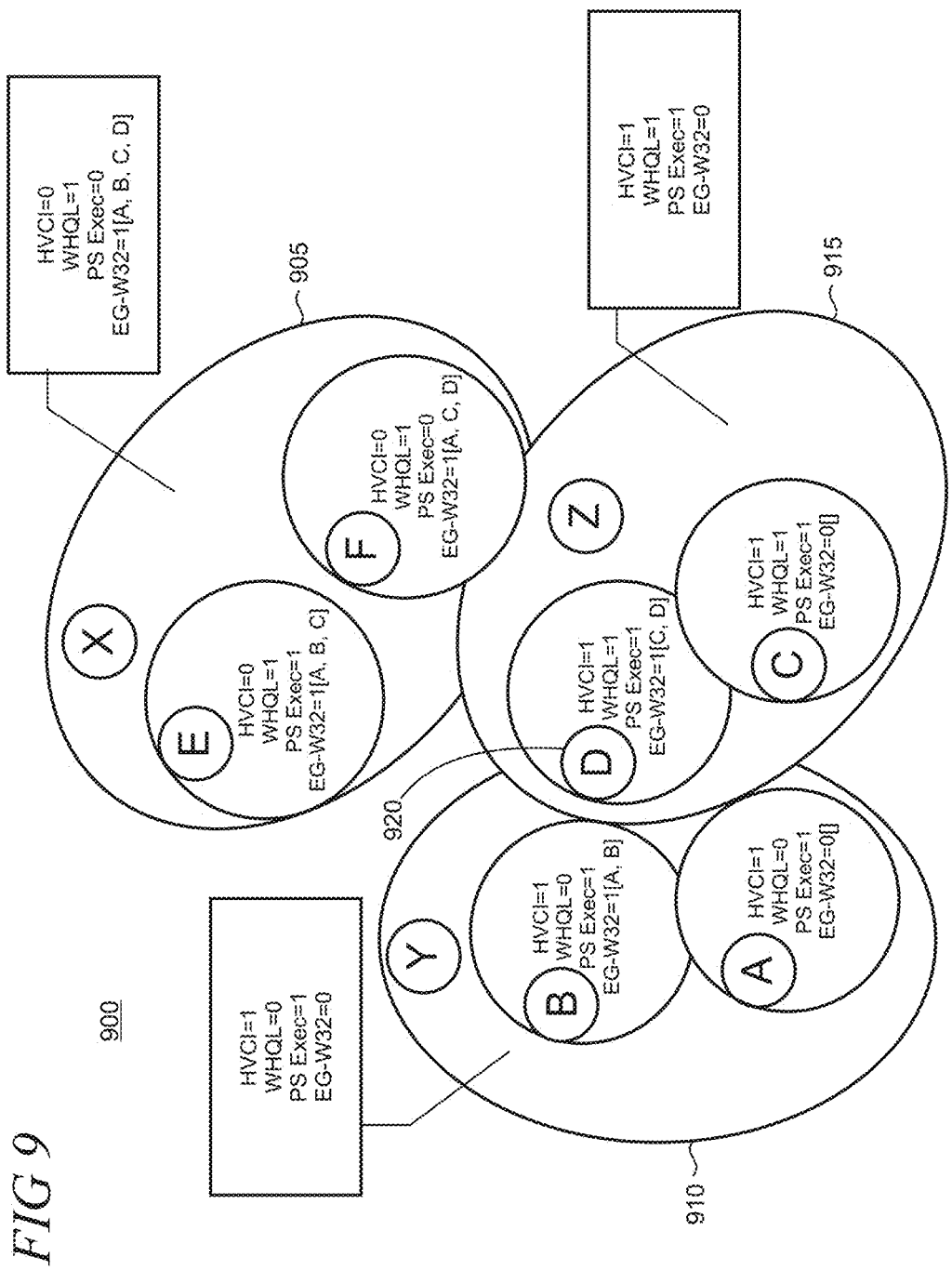
FIG. 9 shows an illustrative starting cluster configuration.

An illustrative example of endpoint to cluster adaptation is now presented. FIG. 9 shows an illustrative starting cluster configuration 900 showing three clusters X, Y, and Z (respectively indicated by reference numerals 905, 910, and 915). FIG. 10 shows an illustrative starting feature matrix 1000 which shows the enablement or restriction of the services HVCI, WHQL, PS Exec, and excluded files for the endpoints A, B, C, D, E, and F and clusters X, Y, and Z. FIG. 11 shows an illustrative starting affinity matrix 1100 for those endpoints and clusters based on the enabled/restricted services and files.

Figure 13:
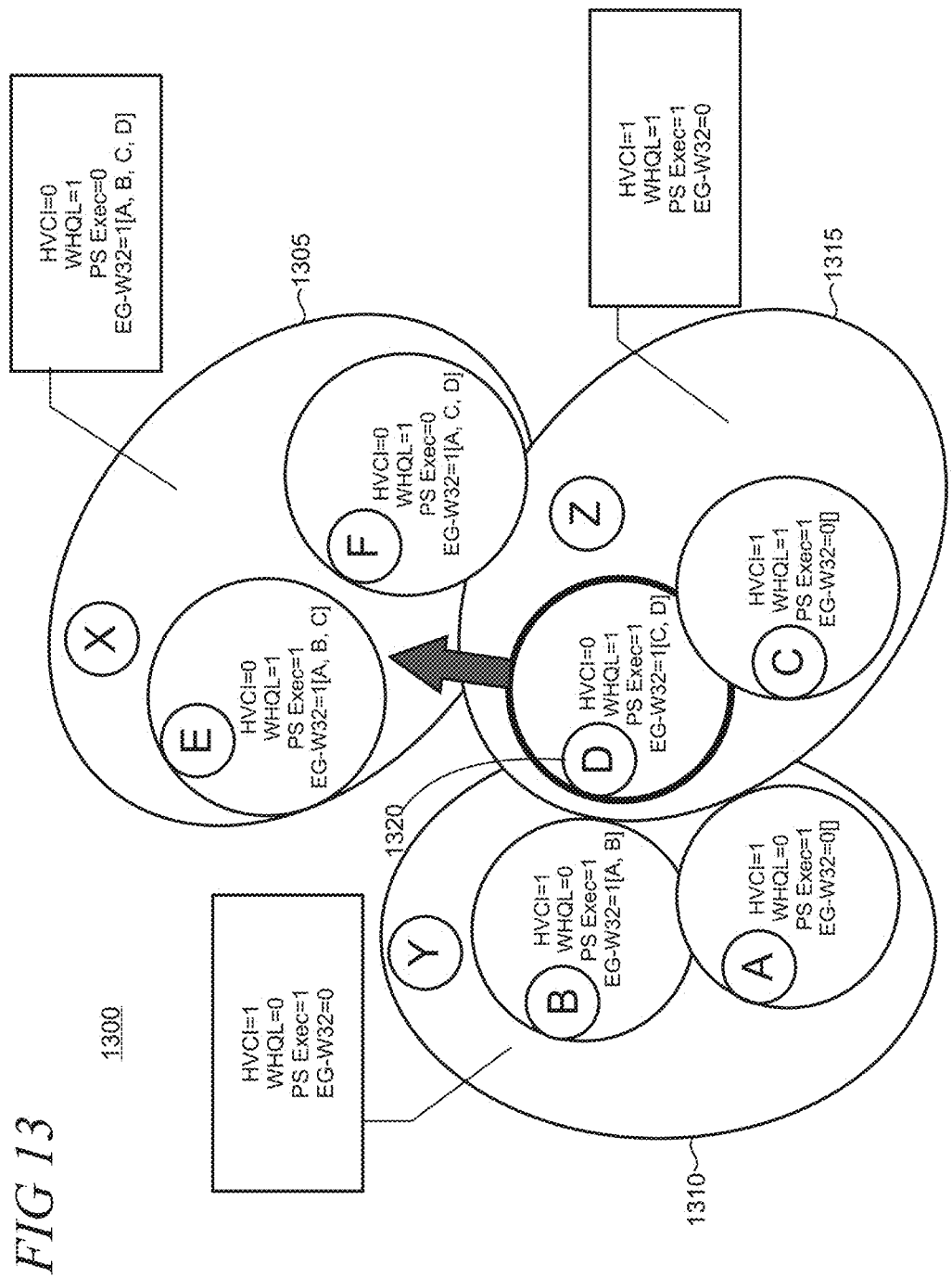
FIG. 13 shows an illustrative cluster configuration in which an endpoint is driven to another cluster based on its affinity to that cluster.

In an illustrative case of an endpoint to cluster adaptation, an HVCI incompatible driver is installed in endpoint D (indicated by reference numeral 920 in FIG. 9) as shown by reference numeral 1205 in the feature matrix 1200 in FIG. 12. This change generates an ASR exception and thereby drives endpoint D's affinity towards cluster X as shown in the cluster configuration 1300 in FIG. 13. The initial affinity of endpoint D to cluster X and endpoint D to cluster Z are both calculated to be 0.63 which thus produces a stalemate, as shown by reference numerals 1405 and 1410 in affinity matrix 1400 in FIG. 14. However, if endpoint D were to leave cluster X, the centroid of X may change if D were the only endpoint forcing cluster X to disable a rule. Furthermore, if D joined cluster Z, its centroid might also change. Endpoint movement has a ripple effect on the joining and leaving cluster centroid. Changes to the cluster centroid may force additional reclustering or breaking away of endpoints.

For endpoint D to join cluster X, X would need to change, and cluster Z likewise would need to be reconfigured to be without the file exclusions needed for endpoint D. The impact of such changes is recalculated as shown in the feature matrix 1500 in FIG. 15 (see reference numeral 1505) and affinity matrix 1600 in FIG. 16 (see reference numerals 1605 and 1610). If the fit of endpoint D to cluster X is improved, then the change is made, otherwise the state of endpoint D in cluster Z is maintained. In this example, the recalculation of the affinity for endpoint D places it in cluster X with endpoints E and F, as indicated by reference numeral 1615 in FIG. 16. The recalculation does not impact membership of any other endpoints in any other clusters.

The second form of adaptation—cluster to cluster mergers—may occur when the affinity between clusters is less than a predetermined configuration threshold. As endpoints migrate, the recalculation of clusters results in changes in cluster to cluster affinity. In the endpoint to cluster adaptation example discussed above, when endpoint D moves to cluster X, EG_FileA requires an exclusion. This moves cluster X closer to both cluster Y and Z. Cluster to cluster moves can have a larger impact on the system security profile, so the configuration threshold for cluster merger is typically selected to be relatively small. The goal of cluster mergers is to minimize system management.

To maximize the security profile and keep the clusters from merging into one permissive cluster, a second control parameter is utilized: max_cluster_delta. If the number of the clusters in a given ASR deployment is found to be M, cluster mergers and cluster creation are kept to M±max_cluster_delta.

In the third form of adaptation—endpoint to new cluster—endpoints in a cluster may disaggregate to form a new cluster based on EHE or URE inputs if the number of clusters after disaggregation is less than M+ max_cluster_delta. In the endpoint to cluster adaptation example discussed above with respect to FIGS. 9-16, the affinity of endpoints D to E is 0.81, while the affinity of D to F is 0.69, and E to F is 0.63. Allowing D and F to split off into a new cluster ZZ, as shown in the feature matrix 1700 in FIG. 17 and the affinity matrix 1800 in FIG. 18 results in four clusters, as respectively indicated by reference numerals 1805, 1810, 1815, and 1820 in FIG. 18.

Figure 19:
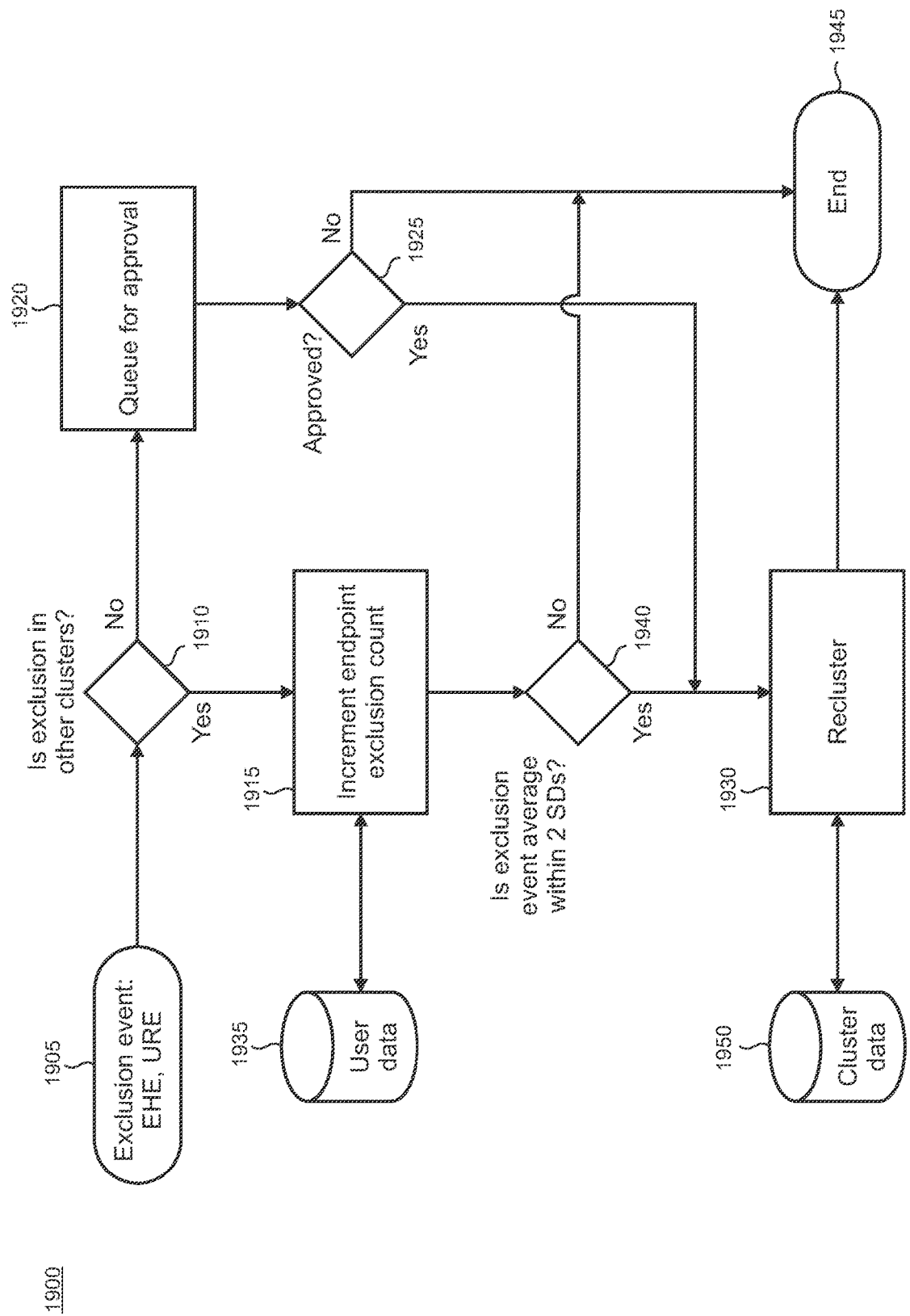
FIG. 19 is a flowchart of an illustrative adaptative clustering process.

FIG. 19 is a flowchart 1900 of an illustrative adaptative clustering process. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

As noted above, the adaptation model uses EHE and URE, but other events can also be utilized depending on the specific requirements of a given implementation. The process flow for both EHE and URE events is similar. Both events in block 1905 are validated against existing exclusions at decision block 1910. If a match is found, the flow can proceed to block 1915. If a match is not found, the exclusion request is forwarded to a queue at block 1920 to the IT/security administrator 135 (FIG. 1) for validation and approval. If the IT/security administrator approves the exclusion, at decision block 1925, the exclusion change is dispatched for reclustering at block 1930. There is no check on the running average in this case.

For both EHE and URE event types, a count and running average is maintained in datastore 1935. At decision block 1940, if the running average is within two standard deviations of the mean, the exclusion can proceed, otherwise it is rejected, and the process ends at block 1945. This check of closeness to the mean is to throttle changes to restrict the possibility of a mass malware or insider attack. If the exclusion event is within these parameters, the exclusion is added for the endpoint in datastore 1950 and reclustering commences with cluster adaptation, as discussed above. An exclusion event generally describes features that are excluded from being instantiated or operated on an endpoint in an organization. Thus, an exclusion event may comprise one or more ASR rules that are excluded from respective endpoints. For example, an ASR rule may be excluded on an endpoint because it generates an audit event.

Figure 20:
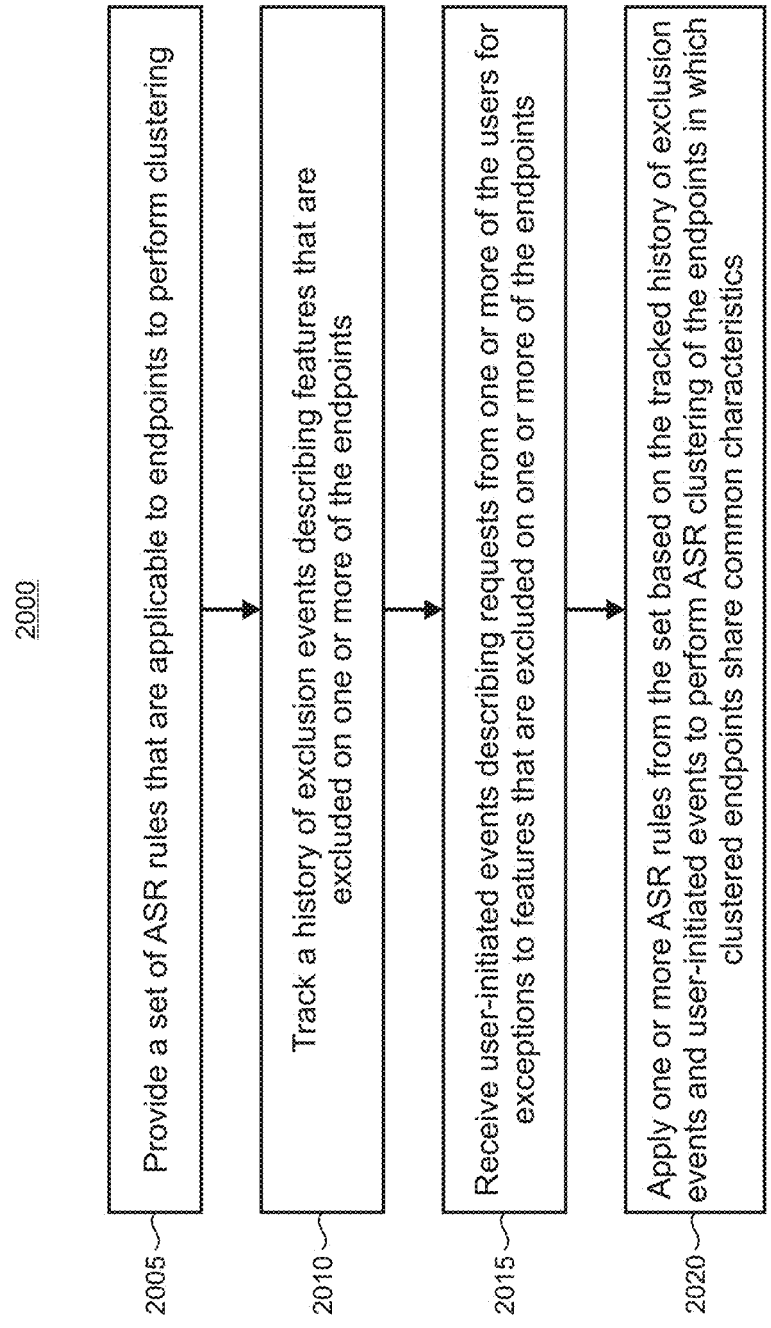
FIGS. 20, 21, and 22 show illustrative methods that may be performed when implementing the present adaptation of ASR clusters.
Figure 21:
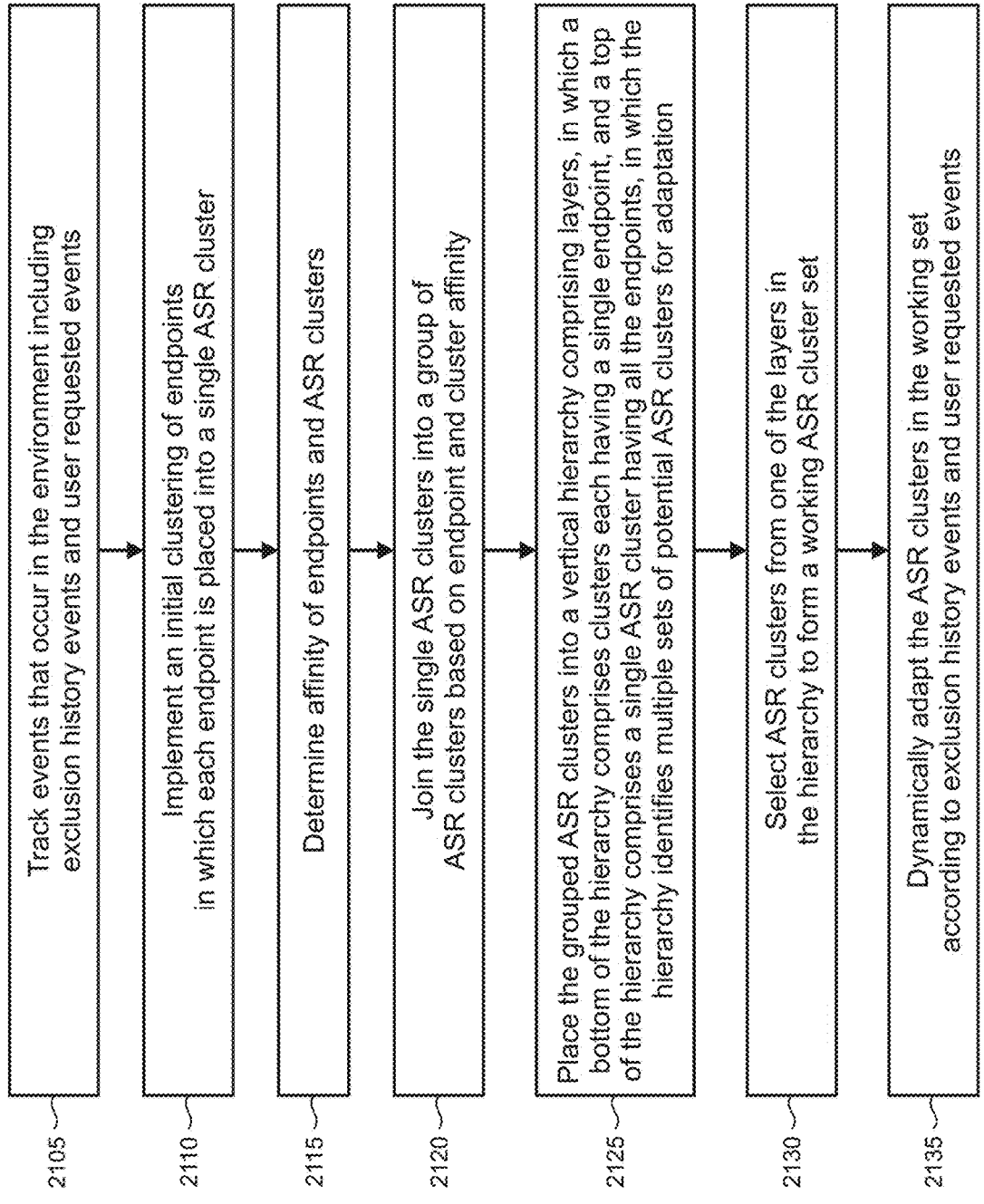
Figure 22:
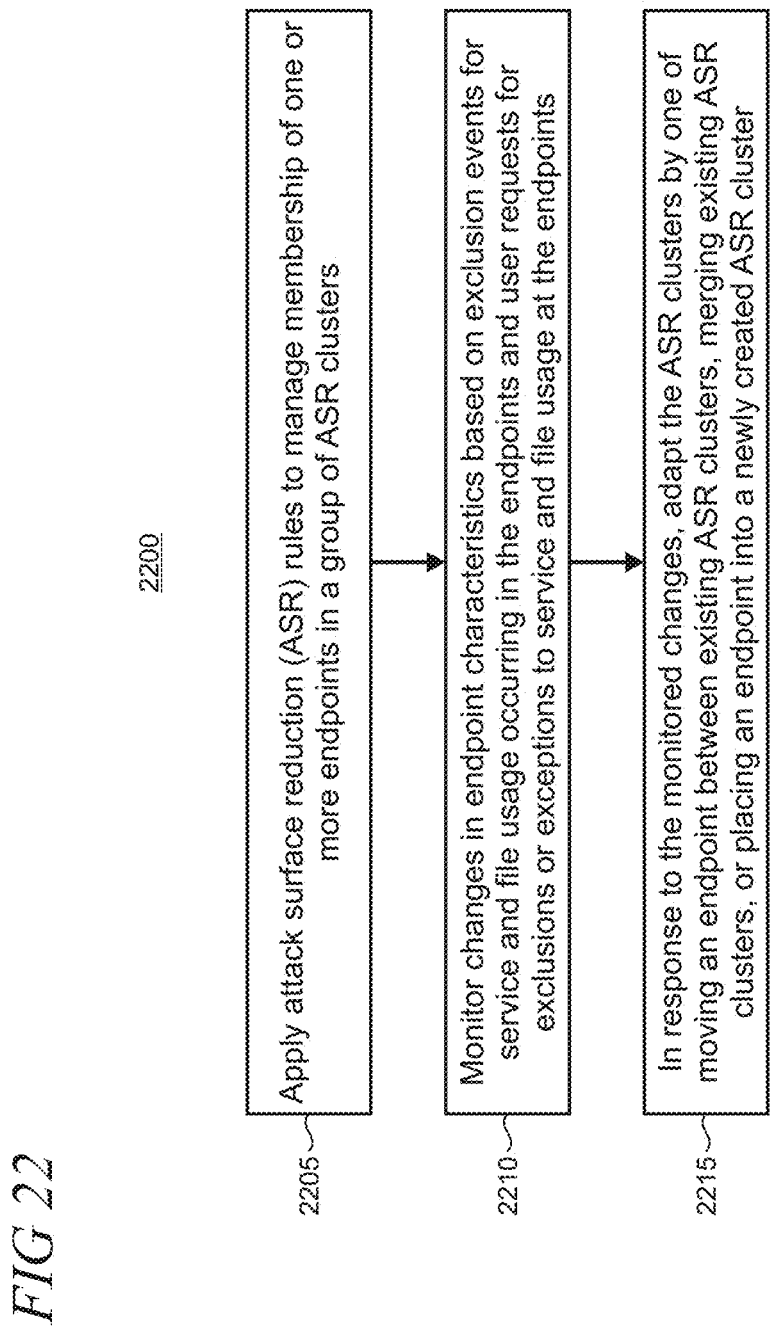

FIGS. 20, 21, and 22 show illustrative methods that may be performed, for example, by the ASR cluster adaptation component 140 (FIG. 1) when implementing the present adaptation of ASR clusters. However, as discussed above, ASR cluster adaptation can be performed by different computing devices or across multiple devices in some implementations.

In step 2005 in the flowchart 2000 in FIG. 20, a set of ASR rules is provided that are applicable to the endpoints to perform clustering. In step 2010, a history of exclusion events describing features that are excluded on one or more endpoints is tracked. In step 2015, user-initiated events describing requests are received from one or more users for exceptions to features that are excluded on one or more of the endpoints. In step 2020, one or more ASR rules from the set are applied based on the tracked history of exclusion events and user-initiated events to perform ASR clustering of the endpoints in which clustered endpoints share common characteristics.

In step 2105 in the flowchart 2100 in FIG. 21, events that occur in the environment including exclusion history events and user requested events are tracked. In step 2110, an initial clustering of endpoints is implemented in which each endpoint is placed into a single ASR cluster. In step 2115, affinity of endpoints and ASR clusters is determined. In step 2120, single ASR clusters are joined into a group of ASR clusters based on endpoint and cluster affinity. In step 2125, grouped ASR clusters are placed into a vertical hierarchy comprising layers, in which a bottom of the hierarchy comprises clusters each having a single endpoint, and a top of the hierarchy comprises a single ASR cluster having all the endpoints, in which the hierarchy identifies multiple sets of potential ASR clusters for adaptation. In step 2130, ASR clusters are selected from one of the layers in the hierarchy to form a working ASR cluster set. In step 2135, the ASR clusters in the working set are dynamically adapted according to exclusion history events and user requested events.

In step 2205 in the flowchart 2200 in FIG. 22, attack surface reduction (ASR) rules are applied to manage membership of one or more endpoints in a group of ASR clusters. In step 2210, changes in endpoint characteristics are monitored in which the changes are based on exclusion events for service and file usage occurring in the endpoints and user requests for exclusions or exceptions to service and file usage at the endpoints. In step 2215, in response to the monitored changes, ASR clusters are adapted by one of moving an endpoint between existing ASR clusters, merging existing ASR clusters, or placing an endpoint into a newly created ASR cluster.

Figure 23:
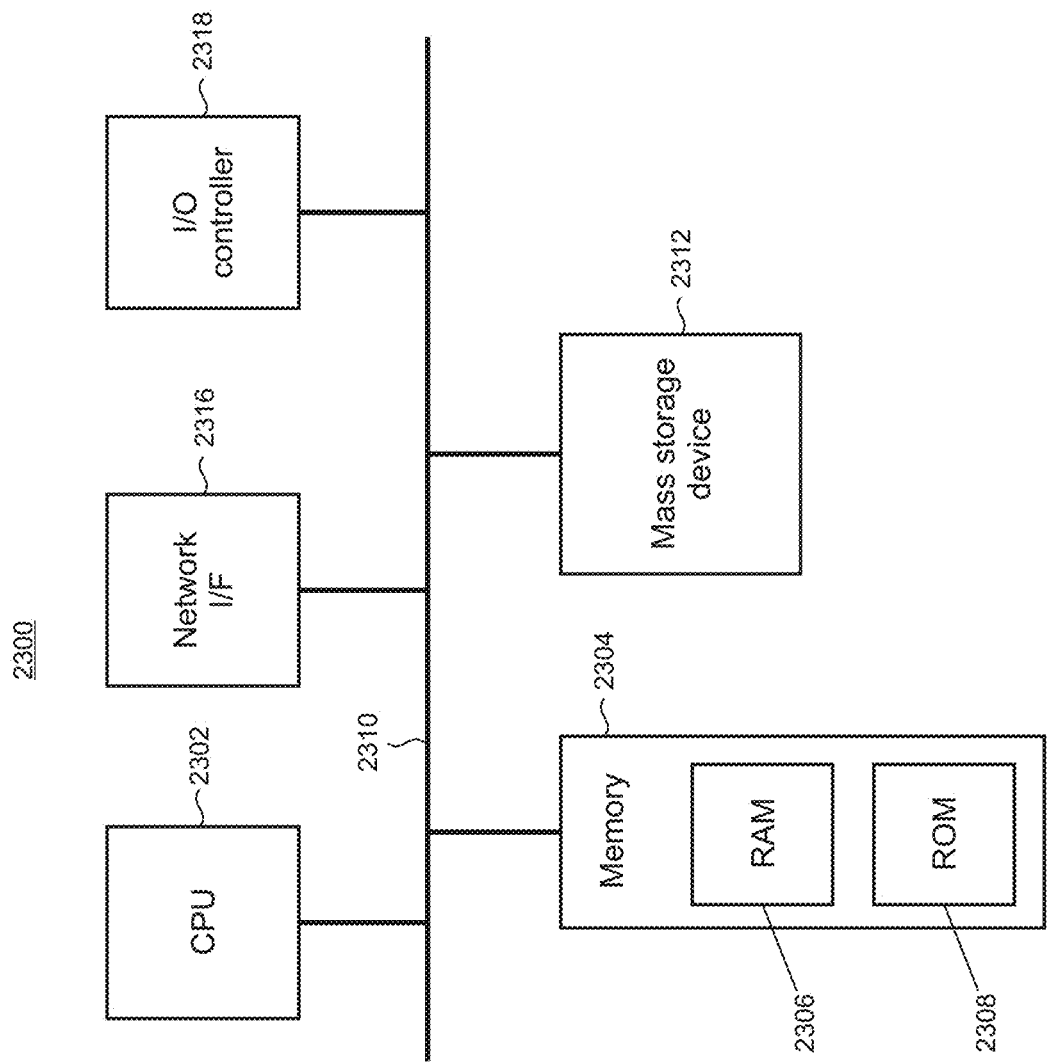
FIG. 23 is a block diagram of an illustrative computing device that may be used at least in part to implement the present adaptation of ASR clusters.

FIG. 23 shows an illustrative architecture 2300 for a device, such as a server, capable of executing the various components described herein for adaptation of ASR clusters. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
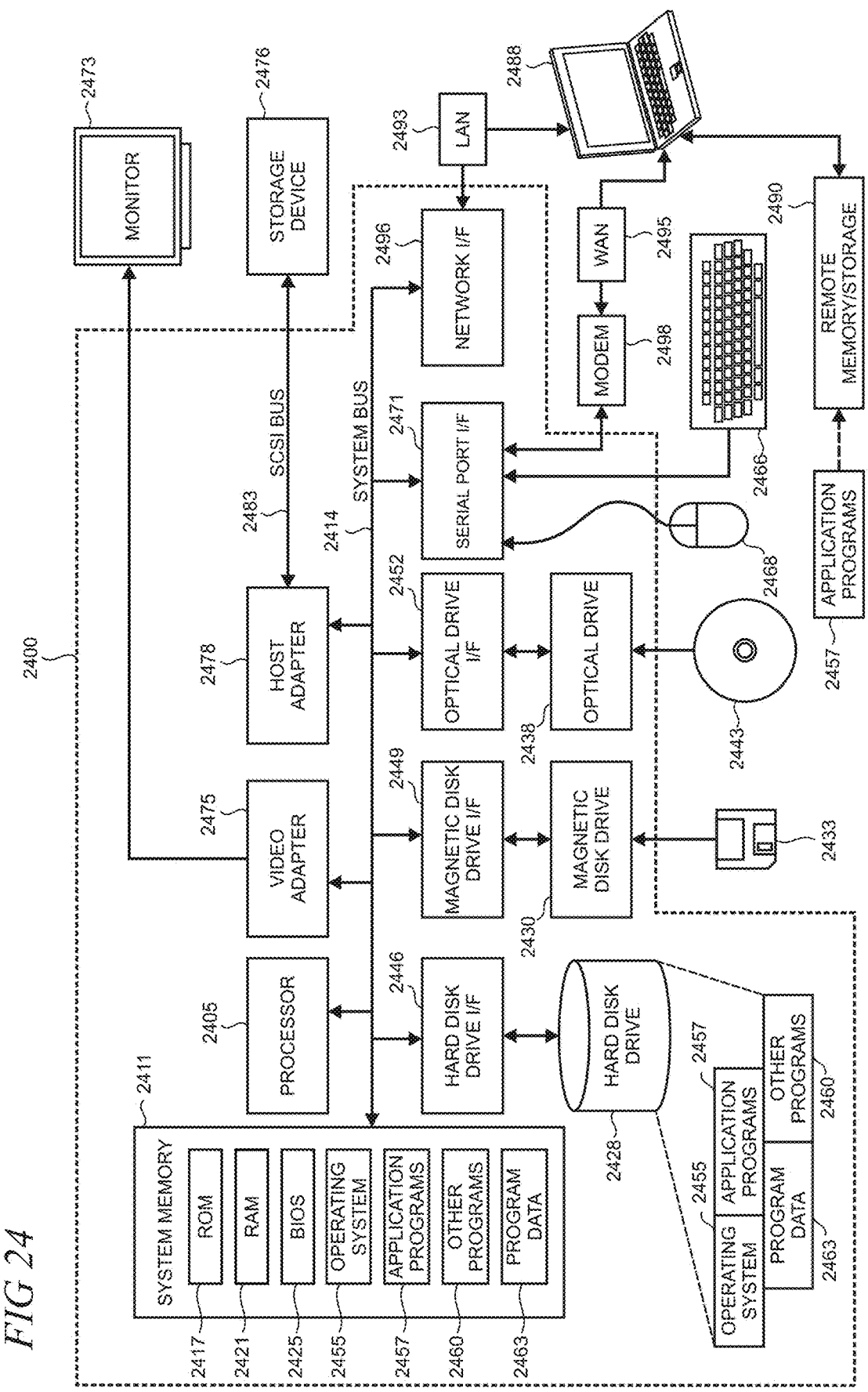
FIG. 24 is a simplified block diagram of an illustrative computing device that may be used at least in part to implement the present adaptation of ASR clusters.

FIG. 24 is a simplified block diagram of an illustrative computing device 2400 such as a PC, client machine, or server with which the present adaptation of ASR clusters may be implemented. Computing device 2400 includes a processor 2405, a system memory 2411, and a system bus 2414 that couples various system components including the system memory 2411 to the processor 2405. The system bus 2414 may be any of several types of bus structures including a memory bus or memory controller, a peripheral bus, or a local bus using any of a variety of bus architectures. The system memory 2411 includes read only memory (ROM) 2417 and random access memory (RAM) 2421. A basic input/output system (BIOS) 2425, containing the basic routines that help to transfer information between elements within the computing device 2400, such as during startup, is stored in ROM 2417. The computing device 2400 may further include a hard disk drive 2428 for reading from and writing to an internally disposed hard disk (not shown), a magnetic disk drive 2430 for reading from or writing to a removable magnetic disk 2433 (e.g., a floppy disk), and an optical disk drive 2438 for reading from or writing to a removable optical disk 2443 such as a CD (compact disc), DVD (digital versatile disc), or other optical media. The hard disk drive 2428, magnetic disk drive 2430, and optical disk drive 2438 are connected to the system bus 2414 by a hard disk drive interface 2446, a magnetic disk drive interface 2449, and an optical drive interface 2452, respectively. The drives and their associated computer-readable storage media provide non-volatile storage of computer-readable instructions, data structures, program modules, and other data for the computing device 2400. Although this illustrative example includes a hard disk, a removable magnetic disk 2433, and a removable optical disk 2443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present user and device authentication for web applications. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2433, optical disk 2443, ROM 2417, or RAM 2421, including an operating system 2455, one or more application programs 2457, other program modules 2460, and program data 2463. A user may enter commands and information into the computing device 2400 through input devices such as a keyboard 2466 and pointing device 2468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2405 through a serial port interface 2471 that is coupled to the system bus 2414, but may be connected by other interfaces, such as a parallel port, game port, or universal serial bus (USB). A monitor 2473 or other type of display device is also connected to the system bus 2414 via an interface, such as a video adapter 2475. In addition to the monitor 2473, personal computers typically include other peripheral output devices (not shown), such as speakers and printers. The illustrative example shown in FIG. 24 also includes a host adapter 2478, a Small Computer System Interface (SCSI) bus 2483, and an external storage device 2476 connected to the SCSI bus 2483.

The computing device 2400 is operable in a networked environment using logical connections to one or more remote computers, such as a remote computer 2488. The remote computer 2488 may be selected as another personal computer, a server, a router, a network PC, a peer device, or other common network node, and typically includes many or all of the elements described above relative to the computing device 2400, although only a single representative remote memory/storage device 2490 is shown in FIG. 24. The logical connections depicted in FIG. 24 include a local area network (LAN) 2493 and a wide area network (WAN) 2495. Such networking environments are often deployed, for example, in offices, enterprise-wide computer networks, intranets, and the Internet.

When used in a LAN networking environment, the computing device 2400 is connected to the local area network 2493 through a network interface or adapter 2496. When used in a WAN networking environment, the computing device 2400 typically includes a broadband modem 2498, network gateway, or other means for establishing communications over the wide area network 2495, such as the Internet. The broadband modem 2498, which may be internal or external, is connected to the system bus 2414 via a serial port interface 2471. In a networked environment, program modules related to the computing device 2400, or portions thereof, may be stored in the remote memory storage device 2490. It is noted that the network connections shown in FIG. 24 are illustrative and other means of establishing a communications link between the computers may be used depending on the specific requirements of an application of the present user and device authentication for web applications.

Various exemplary embodiments of the present adaptation of attack surface reduction clusters are now presented by way of illustration and not as an exhaustive list of all embodiments. An example includes a computing device configured to implement attack surface reduction (ASR) cluster adaptation for a group of machine endpoints utilized by users, each of the endpoints performing code execution that supports a plurality of different features, comprising: one or more processors; and at least one hardware-based non-transitory computer-readable memory having computer-executable instructions stored thereon which, when executed by the one or more processors, cause the computing device to provide a set of ASR rules that are applicable to the endpoints to perform clustering; track a history of exclusion events describing features that are excluded on one or more of the endpoints; receive user-initiated events describing requests from one or more of the users for exceptions to features that are excluded on one or more of the endpoints; and apply one or more ASR rules from the set based on the tracked history of exclusion events and user-initiated events to perform ASR clustering of the endpoints in which clustered endpoints share common characteristics.

In another example, the exclusion events are associated with one or more ASR rules that are excluded at respective endpoints. In another example, the common characteristics comprise one of enabled feature, excluded feature, or excluded file. In another example, the instructions further cause the computing device to dynamically perform adaptation of clusters in response to changes in characteristics of the endpoints. In another example, the adaptation comprises one of endpoint to cluster adaptation in which an endpoint becomes a member of an existing cluster, cluster to cluster adaptation in which existing clusters are merged, or endpoint to new cluster adaptation in which an endpoint becomes a member of a new cluster. In another example, the instructions further cause the computing device to determine endpoint and cluster affinity and adaptation is performed in response to the determination. In another example, the ASR rules provide for a set of exclusions and the exclusions are normalized based on a size of the exclusion set.

A further example includes a method for adaptation of attack surface reduction (ASR) clusters of endpoints in an organization, comprising: tracking events that occur in the environment including exclusion history events and user requested events; implementing an initial clustering of endpoints in which each endpoint is placed into a single ASR cluster; determining affinity of endpoints and ASR clusters; joining the single ASR clusters into a group of ASR clusters based on endpoint and cluster affinity; placing the grouped ASR clusters into a vertical hierarchy comprising layers, in which a bottom of the hierarchy comprises clusters each having a single endpoint, and a top of the hierarchy comprises a single ASR cluster having all the endpoints, in which the hierarchy identifies multiple sets of potential ASR clusters for adaptation; selecting ASR clusters from one of the layers in the hierarchy to form a working ASR cluster set; and dynamically adapting the ASR clusters in the working set according to exclusion history events and user requested events.

In another example, endpoint and clustering affinity is determined using a clustering algorithm that identifies centroids each having a minimal set of distances between points of interest in a cluster. In another example, the clustering algorithm comprises one of hierarchical agglomerative clustering, K-Means, expectation-maximization (EM) clustering, affinity clustering, or penalty score determination that is based on differential ASR rule settings among endpoints. In another example, each of the endpoints represents one of machine or user. In another example, the exclusion history events are based on files or services that are permitted in endpoints in one cluster while blocked in endpoints in another cluster. In another example, the user requested events comprise requests from users for exclusions or exceptions. In another example, the adaptation is dynamically performed in response to changes in characteristics of an endpoint, the characteristics including one of user role change, application update, or new application release. In another example, the hierarchy is configured so that the ASR cluster at the top of the hierarchy provides for minimized business impact on the organization and the ASR cluster at the bottom of the hierarchy provides for maximum security.

A further example includes one or more hardware-based non-transitory computer readable memory devices storing computer-executable instructions which, upon execution by one or more processors in a computing device, cause the computing device to: apply attack surface reduction (ASR) rules to manage membership of one or more endpoints in a group of ASR clusters; monitor changes in endpoint characteristics based on exclusion events for service and file usage occurring in the endpoints and user requests for exclusions or exceptions to service and file usage at the endpoints; and in response to the monitored changes, adapt the ASR clusters by one of moving an endpoint between existing ASR clusters, merging existing ASR clusters, or placing an endpoint into a newly created ASR cluster.

In another example, the instructions further cause the computing device to queue the exclusion events and user requests for review by a human administrator. In another example, the instructions further cause the computing device to manage membership of the endpoints so that the group of ASR clusters does not exceed a predetermined number. In another example, the instructions further cause the computing device to perform the adaptation in view of input parameters comprising user role changes, application updates, and introduction of new applications into an organization that supports the endpoints. In another example, the instructions further cause the computing device to perform the adaptation in response to endpoint and cluster affinity that is determined using vector orthogonality in an n-dimensional binary space.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device configured to implement attack surface reduction (ASR) cluster adaptation for a group of machine endpoints utilized by users, each of the endpoints performing code execution that supports a plurality of different features, comprising:
   one or more processors; and
   at least one hardware-based non-transitory computer-readable memory having computer-executable instructions stored thereon which, when executed by the one or more processors, cause the computing device to
   provide a set of ASR rules that are applicable to the endpoints to perform clustering;

track a history of exclusion events describing features that are excluded on one or more of the endpoints;

receive user-initiated events describing requests from one or more of the users for exceptions to features that are excluded on one or more of the endpoints; and apply one or more ASR rules from the set based on the tracked history of exclusion events and user-initiated events to perform ASR clustering of the endpoints in which clustered endpoints share common characteristics, wherein the adaptation comprises endpoint to cluster adaptation in which an endpoint becomes a member of an existing cluster, cluster to cluster adaptation in which existing clusters are merged, and endpoint to new cluster adaptation in which an endpoint becomes a member of a new cluster.

2. The computing device of claim 1 in which the exclusion events are associated with one or more ASR rules that are excluded at respective endpoints.

3. The computing device of claim 1 in which the common characteristics comprise one of enabled feature, excluded feature, or excluded file.

4. The computing device of claim 1 in which the instructions further cause the computing device to dynamically perform adaptation of clusters in response to changes in characteristics of the endpoints.

5. The computing device of claim 1 in which the instructions further cause the computing device to determine endpoint and cluster affinity and adaptation is performed in response to the determination.

6. The computing device of claim 1 in which the ASR rules provide for a set of exclusions and the exclusions are normalized based on a size of the exclusion set.

7. A method for adaptation of attack surface reduction (ASR) clusters of endpoints in an organization that supports a computing environment, comprising:

tracking events that occur in the computing environment including exclusion history events and user requested events;

implementing an initial clustering of endpoints in which each endpoint is placed into a single ASR cluster;

determining affinity of endpoints and ASR clusters;

joining the single ASR clusters into a group of ASR clusters based on endpoint and cluster affinity;

placing the grouped ASR clusters into a vertical hierarchy comprising layers, in which a bottom of the hierarchy comprises clusters each having a single endpoint, and a top of the hierarchy comprises a single ASR cluster having all the endpoints, in which the hierarchy identifies multiple sets of potential ASR clusters for adaptation;

selecting ASR clusters from one of the layers in the hierarchy to form a working ASR cluster set; and dynamically adapting the ASR clusters in the working set according to exclusion history events and user requested events, wherein the hierarchy is configured so that the ASR cluster at the top of the hierarchy provides for minimized business impact on the organization and the ASR cluster at the bottom of the hierarchy provides for maximum security.

8. The method of claim 7 in which endpoint and clustering affinity is determined using a clustering algorithm that identifies centroids each having a minimal set of distances between points of interest in a cluster.

9. The method of claim 8 in which the clustering algorithm comprises one of hierarchical agglomerative clustering, K-Means, expectation-maximization (EM) clustering, affinity clustering, or penalty score determination that is based on differential ASR rule settings among endpoints.

10. The method of claim 7 in which each of the endpoints represents one of machine or user.

11. The method of claim 7 in which the exclusion history events are based on files or services that are permitted in endpoints in one cluster while blocked in endpoints in another cluster.

12. The method of claim 7 in which the user requested events comprise requests from users for exclusions or exceptions.

13. The method of claim 7 in which the adaptation is dynamically performed in response to changes in characteristics of an endpoint, the characteristics including one of user role change, application update, or new application release.

14. One or more hardware-based non-transitory computer readable memory devices storing computer-executable instructions which, upon execution by one or more processors in a computing device, cause the computing device to:

apply attack surface reduction (ASR) rules to manage membership of one or more endpoints in a group of ASR clusters in which endpoints in an ASR cluster share common characteristics;

monitor changes in endpoint characteristics based on exclusion events for service and file usage occurring in the endpoints; and monitor changes in user requests for exclusions or exceptions to service and file usage at the endpoints; and in response to the monitored changes in endpoint characteristics and user requests, apply the ASR rules to perform adaptation of the ASR clusters, wherein the adaptation comprises endpoint to cluster adaptation in which an endpoint becomes a member of an existing cluster, cluster to cluster adaptation in which existing clusters are merged, and endpoint to new cluster adaptation in which an endpoint becomes a member of a new cluster.

15. The one or more hardware-based non-transitory computer-readable memory devices of claim 14 in which the instructions further cause the computing device to queue the exclusion events and user requests for review by a human administrator.

16. The one or more hardware-based non-transitory computer-readable memory devices of claim 14 in which the instructions further cause the computing device to manage membership of the endpoints so that the group of ASR clusters does not exceed a predetermined number.

17. The one or more hardware-based non-transitory computer-readable memory devices of claim 14 in which the instructions further cause the computing device to perform the adaptation in view of input parameters comprising user role changes, application updates, and introduction of new applications into an organization that supports the endpoints.

18. The one or more hardware-based non-transitory computer-readable memory devices of claim 14 in which the instructions further cause the computing device to perform the adaptation in response to endpoint and cluster affinity that is determined using vector orthogonality in an n-dimensional binary space.

* * * * *